United States Patent
Schwering et al.

(10) Patent No.: US 12,549,517 B2
(45) Date of Patent: Feb. 10, 2026

(54) COMMUNICATION SYSTEM AND METHOD FOR SECURELY TRANSMITTING TIME-CRITICAL DATA WITHIN THE COMMUNICATION SYSTEM

(71) Applicant: Siemens Aktiengesellschaft, Munich (DE)

(72) Inventors: Wolfgang Schwering, Röttenbach (DE); Frank Laurig, Sengenthal (DE); Peter Schönemann, Nuremberg (DE); Nils Gedicke, Jockgrim (DE); Volker Gsänger, Kammerstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/868,269

(22) PCT Filed: Apr. 25, 2023

(86) PCT No.: PCT/EP2023/060752
§ 371 (c)(1),
(2) Date: Nov. 22, 2024

(87) PCT Pub. No.: WO2023/227312
PCT Pub. Date: Nov. 30, 2023

(65) Prior Publication Data
US 2025/0175451 A1    May 29, 2025

(30) Foreign Application Priority Data
May 25, 2022    (EP) ..................... 22175490

(51) Int. Cl.
*H04L 9/40*    (2022.01)
*H04L 12/46*   (2006.01)

(52) U.S. Cl.
CPC ...... *H04L 63/0227* (2013.01); *H04L 63/0281* (2013.01); *H04L 63/0876* (2013.01); *H04L 63/101* (2013.01)

(58) Field of Classification Search
CPC ............ H04L 63/0227; H04L 63/0281; H04L 63/0876; H04L 63/101
See application file for complete search history.

(56) References Cited

U.S. PATENT DOCUMENTS

2020/0220846 A1    7/2020  Schwering
2020/0259896 A1*   8/2020  Sachs ...................... H04L 67/12
(Continued)

FOREIGN PATENT DOCUMENTS

CN    113347168    9/2021
CN    114024706    2/2022
(Continued)

OTHER PUBLICATIONS

PCT International Search Report dated Aug. 16, 2023 based on PCT/EP2023/060752 filed Apr. 25, 2023.

*Primary Examiner* — Aftab N. Khan
(74) *Attorney, Agent, or Firm* — Cozen O'Connor

(57) ABSTRACT

A method for securely transmitting time-critical data within a communication system including local networks in which data are transmitted via switching, at least one network superimposed with respect to the local networks, in which data are transmitted via routing, and a gateway system for connecting the communication system to an unsecured external network, wherein network layer communication via the superimposed network is authorized only between authenticated system components, switches authenticate connected terminal devices and assign these to a physical or logical local network in accordance with a respective terminal device identity, security layer communication is authorized within the local networks implicitly based on an (Continued)

assignment of respective terminal devices to the same local network, communication at OSI layer 3-7 between terminal devices of different local networks or with terminal devices in the unsecured external network is authorized via zero trust proxies that are each assigned to a local network.

22 Claims, 3 Drawing Sheets

(56) References Cited

U.S. PATENT DOCUMENTS

| | | | |
|---|---|---|---|
| 2021/0112034 A1* | 4/2021 | Sundararajan | H04L 41/0894 |
| 2021/0168125 A1* | 6/2021 | Vemulpali | H04L 9/3236 |
| 2022/0128985 A1* | 4/2022 | Szigeti | G05B 23/0256 |
| 2022/0353244 A1* | 11/2022 | Kahn | H04L 67/12 |
| 2022/0385590 A1* | 12/2022 | Haramaty | H04L 63/164 |
| 2023/0104568 A1* | 4/2023 | Miriyala | H04L 45/42 |
| | | | 718/104 |
| 2023/0107891 A1* | 4/2023 | Miriyala | H04L 41/122 |
| | | | 370/254 |

FOREIGN PATENT DOCUMENTS

| | | |
|---|---|---|
| EP | 4096182 | 11/2022 |
| WO | 2019042915 | 3/2019 |
| WO | 2020182627 | 9/2020 |
| WO | 2020212051 | 10/2020 |

* cited by examiner

COMMUNICATION SYSTEM AND METHOD FOR SECURELY TRANSMITTING TIME-CRITICAL DATA WITHIN THE COMMUNICATION SYSTEM

CROSS-REFERENCE TO RELATED APPLICATIONS

This is a U.S. national stage of application No. PCT/EP2023/060752 filed 25 Apr. 2023. Priority is claimed on European Application No. 22175490.6 filed 25 May 2022, the content of which is incorporated herein by reference in its entirety.

BACKGROUND OF THE INVENTION

1. Field of the Invention

The present invention relates to a communication system and method for securely transmitting time-critical data within the communication system, in particular within the communication system of an industrial automation system.

2. Description of the Related Art

Industrial automation systems usually comprise a plurality of automation devices networked with one another via an industrial communication network and serve, within the framework of production or process automation, to control, regulate or monitor plants, machines or devices. Due to time-critical general conditions in industrial automation systems, real-time communication protocols such as PROFINET, PROFIBUS, real-time Ethernet or Time-Sensitive Networking (TSN), are predominantly used for communication between automation devices. In particular, control services or applications can be automated and distributed, depending on load, between currently available servers or virtual machines of an industrial automation system.

WO 2019/042915 A1 discloses a method for checking datagrams transmitted within an industrial automation system with a number of automation cells, in which the datagrams to be checked are transmitted from the automation cells via a respective firewall interface for checking at the firewall system and undergo rule-based checking there. The firewall system is formed by at least one virtual machine within a data processing system comprising a number of processing units. For transmission of the datagrams to be checked, a security layer tunnel is set up between the each respective firewall interface and the firewall system. Both datagrams to be checked and also at least successfully checked datagrams are transmitted within the respective security layer tunnel.

WO 2020/182627 A1 describes a method for monitoring the integrity of an industrial cyber physical system, in which measurement data that has been detected by various sensors of the cyber physical system or control data that is determined for various actuators is provided or tapped. Moreover, at least one measurement data relationship parameter between the measurement data detected with the various sensors is established, or at least one control data relationship parameter between the control data determined for the various actuators is established. The at least one measurement data relationship parameter is compared with a measurement data relationship reference, or the at least one control data relationship parameter is compared with a control data relationship reference. Based on the comparison, the integrity of the cyber physical system to be monitored is assessed.

WO 2020/212051 A1 relates to an industrial automation device that comprises a monitoring unit for testing and monitoring the integrity state of the industrial automation device. Moreover, at least one device component is provided, which communicates over a communication connection with the monitoring unit without feedback. Here, the feedback-free communication comprises the process of providing at least one device component parameter to the monitoring unit by the device component. The monitoring unit is configured to record and to process the provided device component parameter of the device component of the industrial automation device for testing and monitoring of the integrity state of the industrial automation device. The monitoring unit is furthermore configured to record or to provide the integrity state of the industrial automation device as a result of the processed device component parameter of the device component of the industrial automation device. Additionally, the monitoring unit is formed as a trusted device component that is protected against manipulation in the industrial automation device by a manipulation protection system.

European patent application with the application number 21176125.9 discloses a known method for securely granting access to data or resources within a communication system that is subdivided into a number of security zones, which each comprise a plurality of devices connected physically or logically to one another. Selected devices assigned to the same security zone exchange unprotected data with one another and implicitly authorize access to data or resources. A gateway component or a testing entity assigned to the respective security zone, for granting access from external devices outside the security zone to the data or resources provided by at least selected devices of the security zone, demands proof of identity and also access authorizations and checks these with the aid of security guidelines. With successful validation of the proof of identity and access authorizations, protected connections for transmission of data or for access to resources are set up between at least selected devices of different security zones via the respective gateway components in each case.

Zero trust concepts provide for users or devices, regardless of their respective position or environment, to authenticate themselves in relation to communication partners, in order, after successful authentication, to be able to access desired data or applications, for example. In industrial automation systems the problem with respect to use of zero trust concepts is that not every user or every device is capable, in particular with respect to commercial aspects, of being performing an authentication. Basically, confidentiality and data integrity must be guaranteed for a transmission of data within industrial automation systems or to superimposed systems, such as for a transmission of jobs to a machine or of production data of the machine to superimposed systems. In general, these requirements apply for communication relationships between IT (Information Technology) systems and OT (Operational Technology) systems.

In addition to data security, a deterministic data transmission and processing must also be ensured in communication networks of industrial automation systems. In industrial automation systems, deterministic behavior is especially required to guarantee functional safety. A mutual authentication in relation to communication partners provided in accordance with zero trust concepts renders deterministic data transmission and processing more difficult, however.

In industrial automation systems, a granular segmentation of communication networks is usual, where Open Systems Interconnection (OSI) layer 2 network segments are kept as small as possible for reasons of availability. In this way, any errors that might possibly arise are simpler to trace. Moreover, a granular segmentation is helpful for restricting to a minimum degree possible communication relationships, with data transmission not protected or only having weak protection. Such requirements conflict, however, with the communication needs, in particular between IT systems and OT systems. Thus perimeter-based security concepts with a plurality of cell protection firewalls do not represent a satisfactory solution.

SUMMARY OF THE INVENTION

In view of the foregoing, it is an object of the present invention to provide an apparatus and method for securely transmitting time-critical data within a communication system that, especially in industrial automation systems, makes possible a simultaneous guarantee of data security and determinism.

This and other objects and advantages are achieved in accordance with the invention by communication system and by a method for securely transmitting time-critical data within a communication system, where the communication system comprises a plurality of local networks in which data is transmitted via switching, at least one network superimposed in relation to the local networks, in which data is transmitted via routing, and a gateway system for linking the communication system to at least one unsecured external network. Network layer communication (Open Systems Interconnection (OSI) layer 3 communication) via the superimposed network is only authorized between authenticated system components. In such cases, switches authenticate terminal devices connected in each case and accordingly assign these according to a respective terminal device identity to a physical or logical local network. Security layer communication (OSI layer 3 communication) within the local networks is implicitly authorized due to an assignment of the respective terminal devices to the same local network. Advantageously, the superimposed network is connected to the local networks and the gateway system, where logical local networks comprise terminal devices assigned to different physical local networks.

Preferably, the local networks each form a broadcast domain, where the switches each comprise a datagram filter component, which filters data traffic between terminal devices connected to the respective switch and terminal devices comprised by other local networks. In particular, the datagram filter component filters the data traffic in each case in accordance with filter rules or a security policy predetermined for the respective terminal. A security policy is usually a technical or organizational document with which security requirements existing in enterprises or institutions are to be implemented and achieved. Core elements are in particular ensuring the integrity, confidentiality, availability or authenticity of information to be protected. A security policy for a datagram filter component or for a firewall defines, for example, how an actual configuration is to be undertaken, which access rights are granted, how recording is undertaken or what defensive measures the datagram filter component or firewall takes in an attack scenario. A security policy can in particular be present as a configuration file, as an XML file, as a device configuration, which can be directly evaluated automatically. It is likewise possible for a security policy to be present in the form of text, which is evaluated via methods based on artificial intelligence or machine learning. Moreover, it is possible for a security policy to be present in graphical form, which is evaluated via image processing or pattern recognition methods.

In accordance with the invention, communication on OSI layer 3-7 between terminal devices of different local networks or with terminal devices in an unsecured external network is authorized by zero trust proxies, which are each assigned to a local network. Here, the terminal devices are each authenticated for each session via the zero trust proxy assigned to their respective local network. For this, for each physical local network, a respective zero trust proxy or for each logical local network a respective zero trust proxy entity in the gateway system is provided.

With the present invention, zero trust concepts can be realized in particular for communication relationships between IT systems and OT systems while taking sufficient account of determinism requirements in OSI layer 2 communication networks. For this, in accordance with the present invention, a protection concept is provided that comprises a first protection stage, which handles communication relationships on OSI layer 2, taking into account determinism requirements, and a second protection stage, which relates to OSI layers 3-7 and provides a use of zero trust concepts. The two-stage protection concept enables a deterministic OSI layer 2 communication between automation devices to be guaranteed and at the same time a greatly enhanced protection level to be achieved.

In accordance with a preferred embodiment of the present invention, the switches establish IP addresses and device names of the respective connected terminal devices and transmit the operation state information of the terminal devices comprising IP addresses and device names or access control lists to a monitoring facility comprised by the gateway system. The monitoring facility checks the operating information or access control lists for anomalies with the aid of reference information. If there are anomalies, then the monitoring facility sends a warning to the respective switch or initiates a control measure for the respective terminal device to resolve the problem. The operating information or access control lists advantageously comprise authentication methods used by the respective terminal device, certificates or a position of the respective terminal device. Additionally, the control measure for the respective terminal device comprises moving the terminal device into an isolated network environment. This particularly includes a blocking of all ports for a terminal device that floods the communication system with too much load in order to separate this from the communication system.

Preferably, the gateway system comprises a decision component formed as a Policy Decision Point for control of the security level communication by use of terminal device-specific security policy. The decision component, in turn, comprises a security policy database, in which information about permitted terminal devices, roles of the respective terminal devices and terminal device authentication requests are stored. Furthermore, the switches advantageously each comprise an integrated implementation component formed as a Policy Enforcement Point for control of the security layer communication. The implementation components are each connected to the decision component and each implement access rights or restrictions implemented by the decision component in accordance with the security policy. In this way, an efficient and reliable implementation of rights or restrictions predetermined by the decision component in accordance with the security policy are guaranteed.

In accordance with a further advantageous embodiment of the present invention, the above implementation components implement access rights and restrictions with respect to terminal devices that are connected to the switch into which the respective implementation component is integrated. Here, contents of the security policy database can be predetermined administratively or via an intent-based networking system. This makes possible a flexible implementation of security policies in industrial automation systems, in particular with respect to existing automation devices with their own authentication functions or with such functions only able to be upgraded with a disproportionately high outlay.

Preferably, security layer tunnels between local networks via the superimposed network are set up via the switches as tunnel end points. Here, the switches form tunnel end points. Data frames sent within the security layer tunnel are each encapsulated into tunnel data frames. An encapsulation or a decapsulation of the tunnel data is preferably implemented by hardware. In this way, a deterministic data transmission is guaranteed even with logical local networks distributed over a number of physical local networks. The tunnel data frames are in particular Virtual extensible Local-Area Network (VXLAN) frames or frames for OSI layer 2 tunnelling of data frames. In addition, the switches advantageously encrypt the security layer communication via the security layer tunnel based on Institute of Electrical and Electronics Engineers (IEEE) 802.1AE (MACSec). Thus, for realization of a secure and high-performance communication on OSI layer 2 there can be recourse to widely-used and proven technical foundations.

The objects and advantages are also achieved in accordance with the invention by a communication system for securely transmitting time-critical data that implements the method in accordance with disclosed embodiments and comprises a plurality of local networks for transmission of data via switching, at least one network superimposed relative to the local networks for transmission of data via routing and a gateway system for linking the communication system to at least one unsecured external network. The superimposed network is configured so that network layer communication via the superimposed network is only authorized between authenticated system components. Moreover, the local networks each comprise at least one switch, which is configured to authenticate each connected terminal device and assign them to a physical or logical local network in accordance with a respective terminal device identity.

The local networks of the inventive communication system are each configured so that security layer communication within the local networks is implicitly authorized due to an assignment of the respective terminal devices to the same local network. By comparison, the terminal devices are each configured so that communication on OSI layer 3-7 between terminal devices of different local networks or with terminal devices in the unsecured external network is authorized via zero trust proxies, which are each assigned to a local network. The zero trust proxies are further each configured so that the terminal devices are authenticated for each session via the zero trust proxy assigned to their respective local network. Here, for each physical local network a zero trust proxy in the network or for each logical local network a respective zero trust proxy entity in the gateway system is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be explained in greater detail by an exemplary embodiment, with the aid of the drawing, in which.

DETAILED DESCRIPTION OF THE EXEMPLARY EMBODIMENTS

Figure 1:
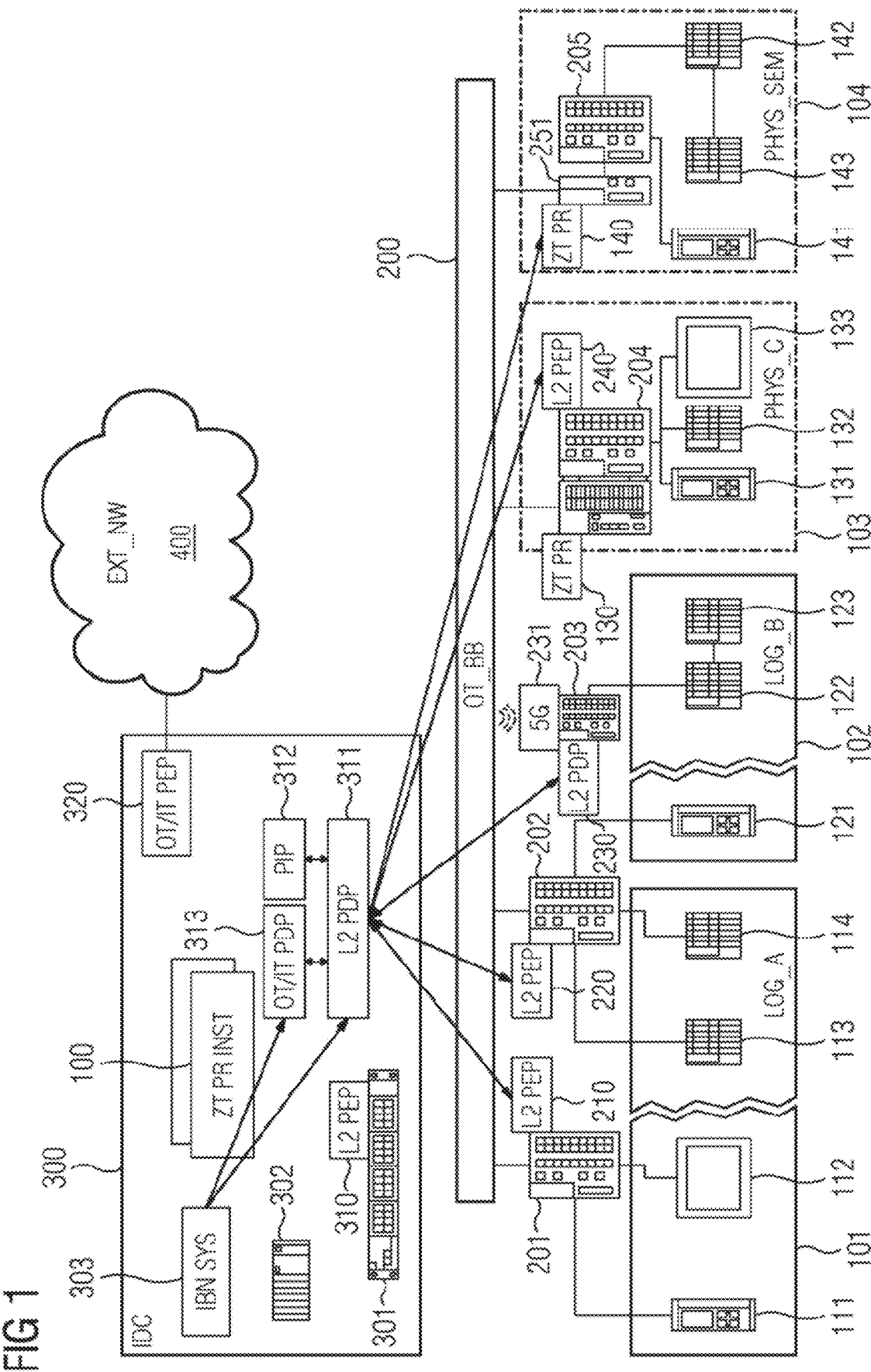
FIG. 1 shows an arrangement with a communication system for securely transmitting time-critical data and an unsecured external network in accordance with the invention.

The arrangement shown in FIG. 1 comprises a communication system with a plurality of local networks 101, 102, 103, 104 for transmitting data via switching, a network 200 superimposed relative to the local networks 101, 102, 103, 104 for transmitting data via routing and a gateway system 300 for linking the communication system to an unsecured external network 400. The local networks 101, 102, 103, 104 each form a broadcast domain. The superimposed network 200 is connected to the local networks 101, 102, 103, 104 and to the gateway system 300. Here, logical local networks 101-102 can comprise terminal devices 111, 112, 113, 114, 121-122 assigned to different physical local networks.

Figure 2:
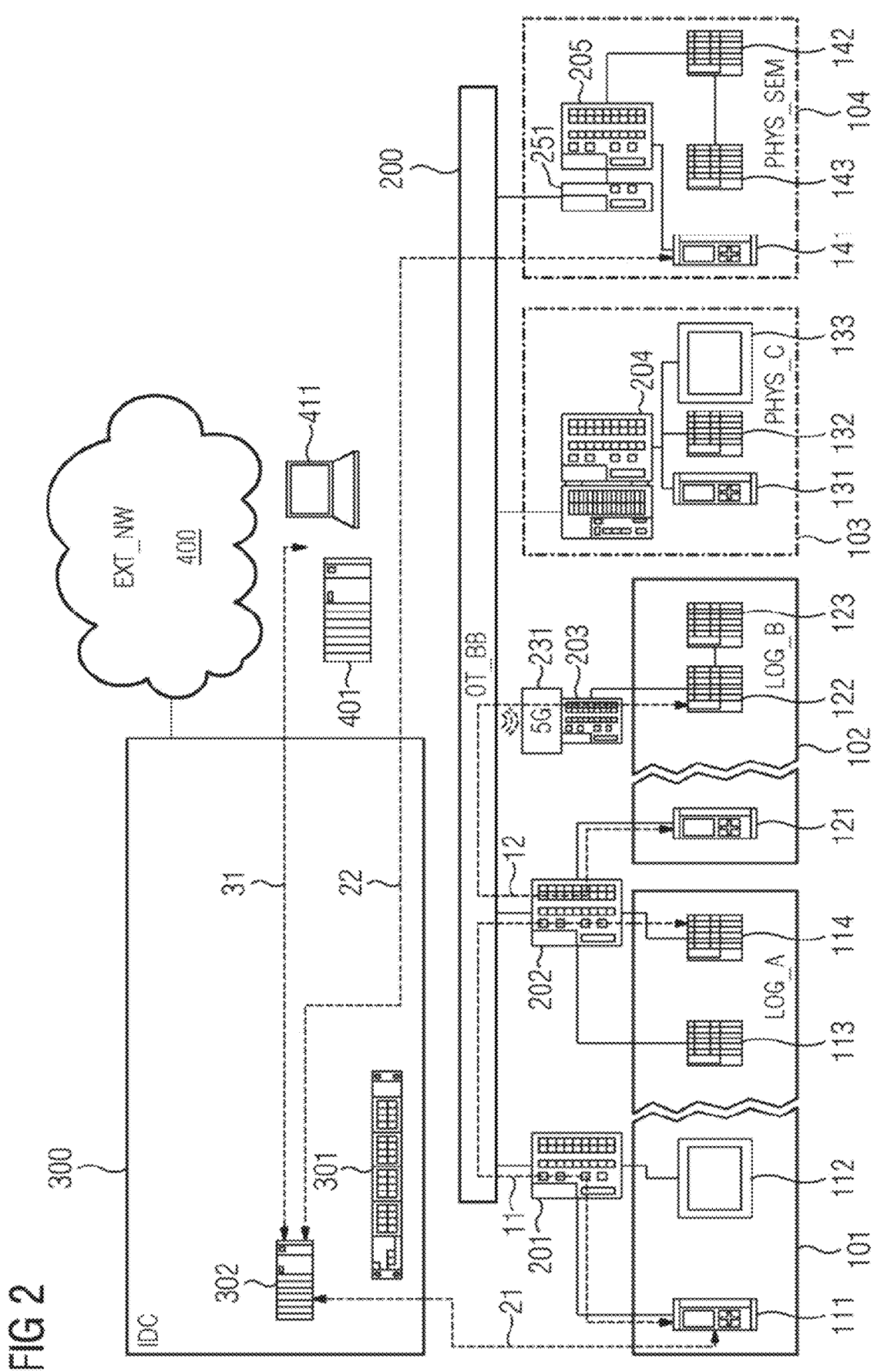
FIG. 2 shows a schematic diagram of securely transmitting time-critical data within the arrangement shown in FIG. 1.

For example, the terminal devices 111-112 of a first logical local network 101 are connected to a first switch 201, which is connected via the superimposed network 200 to a second switch 202, to which the terminal devices 113-114 of the first logical local network 101 are connected. There is security layer communication (OSI layer 2) between the first switch 201 and the second switch 202 within the first logical local network 101 in accordance with FIG. 2 via a security layer tunnel 11. Here, the switches 201-202 form tunnel end points, and data frames sent within the security layer tunnels 11 are each encapsulated into tunnel data frames.

A terminal device 121 of a second logical network 102 is also connected to the second switch 202, which also comprises a terminal device 122 connected to a third switch 203. The terminal device 122 is connected, in turn, to a peripheral device 123. In the present exemplary embodiment, the third switch 203 is connected to the superimposed network 200 via a 5G mobile radio router 231. In a way corresponding to that used for the first logical local network 101, communication between the second switch 202 and the third switch 203 occurs within the second logical local network 102 in accordance with FIG. 2 via a security layer tunnel 12. Here, the switches 202-203 form tunnel end points, and data frames sent within the security layer tunnel 12 are each encapsulated into tunnel data frames.

The terminal devices 131, 132, 133 connected to a fourth switch 204 are assigned to a common physical local network 103. A fifth switch 205 is assigned to a physical local network 104, which is comprises by a series machine, which has a number of automation components formed by the terminal devices 141-142 and a peripheral device 143. Here, the peripheral device 143 is connected to the terminal device 142.

The terminal devices or peripheral devices 111-114, 121-123, 131-133, 141-143 are in particular physical or virtual hosts, which can provide data or resources for other hosts. The data or resources can be assigned to services or control and monitoring applications of an industrial automation system for example that are exemplary for time-critical services or applications.

In the present exemplary embodiment, the terminal devices or peripheral devices 111-114, 121-123, 131-133, 141-143 implement functions of control devices of an industrial automation system, such as programmable logic controllers, or of field devices such as sensors or actuators. In such cases, the terminal devices or peripheral devices 111-114, 121-123, 131-133, 141-143 serve to exchange control and measurement variables with machines or apparatuses controlled by control devices. In particular, the control devices are provided for establishing suitable control variables from measurement variables detected.

As an alternative or in addition, the terminal devices or peripheral devices 111-114, 121-123, 131-133, 141-143 each implement an operation and monitoring station that serve for visualization of process data or measurement and control variables that are processed or detected by control devices or other automation devices. In particular, an operation and monitoring station can be used for display of values of a closed-loop control circuit and for changing closed-loop control parameters or programs.

In the present exemplary embodiment, the gateway system 300 in particular comprises a switch 301 connected to the superimposed network 200, a router 302 connected to this switch 301 and also to the unsecured external network 400 and an intent-based networking system 303. With all the switches 201-205, 301 security layer tunnels can be set up between different local networks 101-105 or to the gateway system 300 via the superimposed network 200.

In a way corresponding to that for the two logical local networks 101-102, the switches 201-205, 301, for a security layer communication between different local networks 101-104 or to the gateway system 300 via the superimposed network 200, form tunnel end points. Here, data frames sent within the security layer tunnel are also encapsulated into tunnel data frames. An encapsulation or a decapsulation of the tunnel data is preferably implemented by hardware, in particular for performance reasons with respect to guaranteeing a deterministic transmission of data when using security layer tunnels. The tunnel data frames can, for example, be VXLAN frames in accordance with Internet Engineering Task Force (IETF) Request for Comments (RFC) 7348 or frames for OSI layer 2 tunnelling of data. The switches 201-205, 301 each encrypt the security layer communication via the security layer tunnel based on IEEE 802.1AE (MACSec).

The switches 201-205 each comprise a datagram filter component, which filters data traffic between terminal devices or their peripheral devices 111-114, 121-123, 131-133, 141-143 connected to the respective switch 201-205 and terminal devices or peripheral devices comprised by other local networks. The datagram filter components each filter the data traffic in accordance with filter rules or in accordance with a security policy predetermined for the respective terminal device or peripheral device 111-114, 121-123, 131-133, 141-143.

What is important is that network layer communication (OSI layer 3) via the superimposed network 200 is only authorized between authenticated system components. In particular, the switches 201-205 authenticate terminal devices or their peripheral devices 111-114, 121-123, 131-133, 141-143 connected in each case for this purposes and assign these in accordance with a respective terminal device identity or peripheral device identity to a physical or logical local network 101-104. Security layer communication within the local networks 101-104 is implicitly authorized due to the assignment of the respective terminal devices or of their peripheral devices 111-114, 121-123, 131-133, 141-143 to the same local network 101-104.

Communication 21-22 on OSI layer 3-7 between terminal devices or peripheral devices 111-114, 121-123, 131-133, 141-143 of different local networks 101-104 or communication on OSI layer 3-7 with terminal devices or peripheral devices 411 in the unsecured external network 400 is authorized via zero trust proxies 100, 130, 140, which are each assigned to a local network. In the present exemplary embodiment, this communication 21-22, 31 occurs via the router 302 of the gateway system 300. For communication 31 with the terminal devices or peripheral devices 411 in the unsecured external network 400, this is additionally undertaken via a router 401 of the unsecured external network 400.

For communication 21-22, 31 on OSI layer 3-7, the terminal devices or peripheral devices 111-114, 121-123, 131-133, 141-143 are each authenticated for each session via the zero trust proxy 100, 130, 140 assigned to their respective local network 101-104. Here, for the physical local networks 103-104, a zero trust proxy 130, 140 assigned there is provided in each case, while for the logical local networks 101-102 a zero trust proxy entity 100 is provided in the gateway system 300 in each case. In addition, a zero trust proxy entity 100 for the terminal devices or peripheral devices 411 in the unsecured external network 400 is provided. An authentication of the terminal devices or peripheral devices 111-114, 121-123, 131-133, 141-143 can generally be undertaken, for example, with the aid of device addresses (IP, MAC) or device certificates.

In the present exemplary embodiment, the switches 201-205 establish IP addresses and device names of the respective terminal devices or peripheral devices 111-114, 121-123, 131-133, 141-143 connected. The switches 201-205 transmit operating state information, comprising these IP addresses and device names, of the terminal devices or peripheral devices 111-114, 121-123, 131-133, 141-143 or access control lists to a monitoring facility 312 comprised by the gateway system 300. The monitoring facility 312 preferably comprises a Policy Information Point (PIP) and checks the operating information or access control lists with the aid of reference information for anomalies. With anomalies, the monitoring facility 312 sends a warning to the respective switch 201-205. As an alternative or in addition to this, the monitoring facility 312 initiates a control measure for the respective terminal device or peripheral device 111-114, 121-123, 131-133, 141-143 to resolve the problem. The operating information or access control lists particularly comprise authentication methods used by the respective terminal device or peripheral device 111-114, 121-123, 131-133, 141-143, certificates or a position of the respective terminal device or peripheral device. The control measure for the respective terminal device or peripheral device 111-114, 121-123, 131-133, 141-143 initiated by the monitoring facility 312 can, for example, comprise moving the terminal device or peripheral devices 111-114, 121-123,

131-133, 141-143 into an isolated network environment, in particular by block all ports for the respective terminal device or peripheral device 111-114, 121-123, 131-133, 141-143. In this way, a terminal device or peripheral device 111-114, 121-123, 131-133, 141-143 that floods the communication system with too much load can be separated from the communication system.

Furthermore, the gateway system 300 in the present exemplary embodiment has a decision component 311 formed as a Policy Decision Point (L2 PDP) for control of the security layer communication by using a security policy specific to terminal devices or peripheral devices. For communication 21-22, 31 on the OSI layer 3-7 or with the external unsecured network 400 a separate Policy Decision Point 313 (OT/IT PDP) and also a Policy Enforcement Point 320 (OT/IT PEP) assigned to this Policy Decision Point 313 are provided.

The decision component 311 comprises a security policy database, in which information about permitted terminal devices or peripheral devices 111-114, 121-123, 131-133, 141-143, roles of the respective terminal devices or peripheral devices and terminal device or peripheral device authentication requirements are stored. By contrast, the switches 201-204, 301 each comprise an integrated implementation component 210, 220, 230, 240, 310 formed as a Policy Enforcement Point (L2 PEP) for control of security layer communication. In the series machine, the implementation component is integrated into a security gateway 251 of the series machine, via which the switch 205 of the series machine is linked to the superimposed network 200. In addition, the security gateway 251 of the series machine comprises a functional unit for translation of communication network addresses (network address translation NAT), because the communication network addresses of the automation components of the series machine are managed or predetermined entirely autonomously within the series machine.

The implementation components 210, 220, 230, 240, 310 or the security gateway 251 are each functionally connected to the decision component 311 and each implement access rights or restrictions predetermined by the decision component 311 according to the security policy. In particular, the implementation components 210, 220, 230, 240 implement access rights or restrictions relative to terminal devices or peripheral devices 111-114, 121-123, 131-133, 141-143 that are connected directly or indirectly to the switch 201-204 into which the respective implementation component 210, 220, 230, 240 is integrated. The security gateway 251 of the series machine implements access rights or restrictions relative to terminal devices or peripheral devices 141-143 that are comprised by the series machine. Communication between the decision component 311, on one side, and the implementation components 210, 220, 230, 240 or the security gateway 251, on the other side, is preferably undertaken in accordance with the RADIUS or DIAMETER protocol.

Contents of the security policy database of the decision component 311 can be predetermined administratively by user intervention or in an automated manner via the intent-based networking system 303. In a corresponding way, contents of a security policy database of the Policy Decision Point 313 can also be predetermined for communication 21-22, 31 on OSI layer 3-7 or with the external unsecured network 400.

Figure 3:
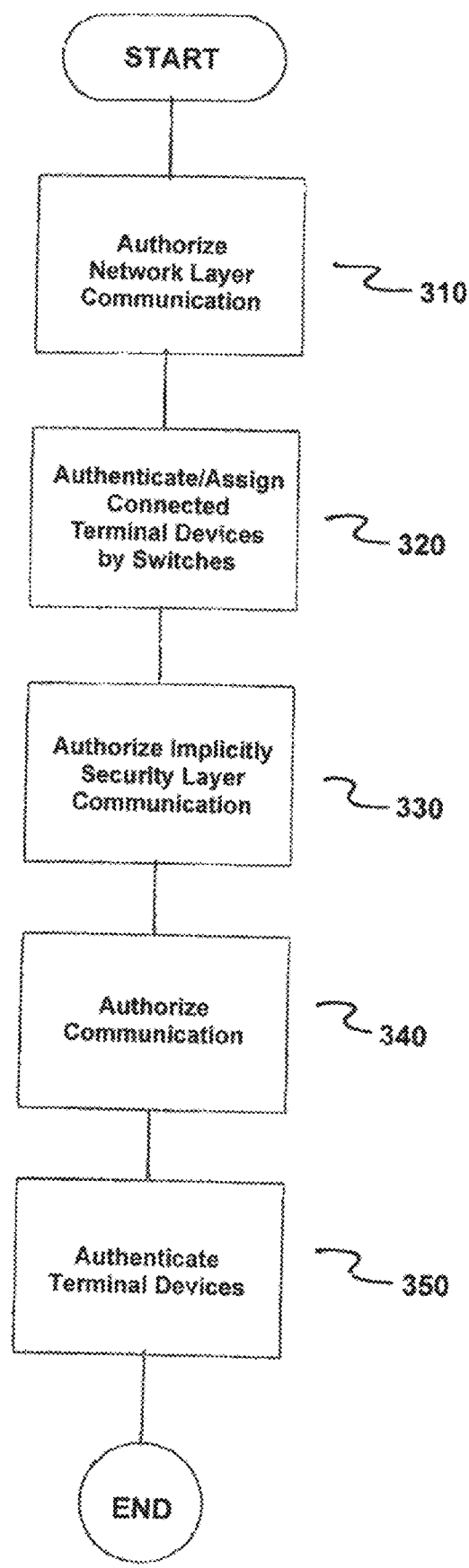
FIG. 3 is a flowchart of the method in accordance with the invention.

FIG. 3 is a flowchart of the method for securely transmitting time-critical data within a communication system comprising a plurality of local networks 101-104 in which data is transmitted via switching, at least one network 200 superimposed in relation to the local networks in which data is transmitted via routing, and a gateway system 300 for linking the communication system to at least one unsecured external network 400.

The method comprises authorizing network layer communication via the superimposed network only between authenticated system components, as indicated in step 310.

Next, switches 201-205 authenticate each connected terminal device 111-114, 121-122, 131-133, 141-142 and assign each connected terminal device 111-114, 121-122, 131-133, 141-142 to a physical or logical local network in accordance with a respective terminal device identity, as indicated in step 320.

Next, security layer communication are authorized implicitly within the local networks based on the assignment of the respective terminal devices to the same local network, as indicated in step 330.

Next, communication on open systems interconnection (OSI) layer 3-7 are authorized between terminal devices of different local networks and/or with terminal devices in the unsecured external network via zero trust proxies 100, 130, 140 that are each assigned to a local network, as indicated in step 340.

Next, the terminal devices for each session are authenticated via the zero trust proxy assigned to their respective local network, as indicated in step 350. In accordance with the inventive method, either for each physical local network 103-104 a zero trust proxy 130, 140 is provided there and/or for each logical local network 101-102 a zero trust proxy entity is provided 100 in the gateway system.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for securely transmitting time-critical data within a communication system comprising a plurality of local networks in which data is transmitted via switching, at least one network superimposed in relation to the local networks in which data is transmitted via routing, and a gateway system for linking the communication system to at least one unsecured external network, the method comprising:

authorizing network layer communication via the superimposed network only between authenticated system components;

authenticating, by switches, each connected terminal device and assigning each connected terminal device to a physical or logical local network in accordance with a respective terminal device identity;

authorizing implicitly security layer communication within the local networks based on the assignment of the respective terminal devices to the same local network;

authorizing communication on open systems interconnection (OSI) layer 3-7 at least one of between terminal devices of different local networks and with terminal devices in the unsecured external network via zero trust proxies which are each assigned to a local network; and authenticating the terminal devices for each session via the zero trust proxy assigned to their respective local network, at least one of for each physical local network a zero trust proxy being provided there and for each logical local network a zero trust proxy entity being provided in the gateway system.

2. The method as claimed in claim 1, wherein the superimposed network is connected to the local networks and the gateway system; and wherein logical local networks comprise terminal devices assigned to different physical local networks.

3. The method as claimed in claim 1, wherein the local networks each form a broadcast domain; and wherein the switches each comprise a datagram filter component which filters data traffic between terminal devices connected to the respective switch and from terminal devices comprised by other local networks.

4. The method as claimed in claim 3, wherein the switches establish IP addresses and device names of each of the connected terminal device and transmit the operating state information comprising the IP addresses and device names of the terminal devices and/or access control lists to a monitoring facility comprised by the gateway system; and
    wherein the monitoring facility checks the operating information and/or access control lists with the aid of reference information for anomalies and with anomalies sends a warning to the respective switch and/or initiates a control measure for the respective terminal device to resolve the problem.

5. The method as claimed in claim 3, wherein the datagram filter components filter the data traffic in each case in accordance with at least one of filter rules and a security policy predetermined for a respective terminal device.

6. The method as claimed in claim 5, wherein the switches establish IP addresses and device names of each of the connected terminal device and transmit the operating state information comprising the IP addresses and device names of the terminal devices and/or access control lists to a monitoring facility comprised by the gateway system; and
    wherein the monitoring facility checks the operating information and/or access control lists with the aid of reference information for anomalies and with anomalies sends a warning to the respective switch and/or initiates a control measure for the respective terminal device to resolve the problem.

7. The method as claimed in claim 1, wherein the switches establish IP addresses and device names of each of the connected terminal device and transmit the operating state information comprising the IP addresses and device names of the terminal devices and/or access control lists to a monitoring facility comprised by the gateway system; and
    wherein the monitoring facility checks the operating information and/or access control lists with the aid of reference information for anomalies and with anomalies sends a warning to the respective switch and/or initiates a control measure for the respective terminal device to resolve the problem.

8. The method as claimed in claim 7, wherein a control measure for the respective terminal device comprises moving the terminal device into an isolated network environment.

9. The method as claimed in claim 7, wherein at least one of the operating information and access control lists comprise at least one of authentication methods, certificates and a position of the respective terminal device utilized by the respective terminal device.

10. The method as claimed in claim 9, wherein a control measure for the respective terminal device comprises moving the terminal device into an isolated network environment.

11. The method as claimed in claim 1, wherein the gateway system comprises a Policy Decision Point formed as a decision component for control of the security layer communication by utilizing terminal device-specific security policies;
    wherein the decision component comprises a security policy database;
    wherein information about permitted terminal devices, roles of the respective terminal devices and terminal device authentication requirements are stored;
    wherein the switches each comprise an integrated implementation component, formed as a Policy Enforcement Point, for control of the security layer communication;
    wherein implementation components are each connected to the decision component; and
    wherein the implementation components each implement access rights and restrictions predetermined by the decision component in accordance with the security policy.

12. The method as claimed in claim 11, wherein contents of the security policy database are predetermined at least one of administratively and via an intent-based networking system.

13. The method as claimed in claim 11, wherein the implementation components implement at least one of access rights and restrictions relative to terminal devices which are connected to the switch into which the respective implementation component is integrated.

14. The method as claimed in claim 13, wherein contents of the security policy database are predetermined at least one of administratively and via an intent-based networking system (303).

15. The method as claimed in claim 1, wherein security layer tunnels between local networks via the superimposed network are set up via the switches;
    wherein the switches form tunnel end points; and wherein data frames sent within the security layer tunnel are each encapsulated in tunnel data frames.

16. The method as claimed in claim 15, wherein the switches each encrypt the security layer communication via the security layer tunnel based on Institute of Electrical and Electronics Engineers (IEEE) 802.1AE, MACSec.

17. The method as claimed in claim 15, wherein at least one of an encapsulation and a decapsulation of the tunnel data is implemented by hardware.

18. The method as claimed in claim 17, wherein the tunnel data frames are Virtual extensible Local-Area Network (VXLAN) frames or frames for open systems interconnection (OSI) layer 2 tunnelling of data frames.

19. The method as claimed in claim 17, wherein the switches each encrypt the security layer communication via the security layer tunnel based on Institute of Electrical and Electronics Engineers (IEEE) 802.1AE, MACSec.

20. The method as claimed in claim 15, wherein the tunnel data frames are Virtual extensible Local-Area Network (VXLAN) frames or frames for open systems interconnection (OSI) layer 2 tunnelling of data frames.

21. The method as claimed in claim 20, wherein the switches each encrypt the security layer communication via the security layer tunnel based on Institute of Electrical and Electronics Engineers (IEEE) 802.1AE, MACSec.

22. A communication system for securely transmitting time-critical data, the communication system comprising:
- a plurality of local networks for transmitting the data via switching;
- at least one network superimposed in comparison to the plurality of local networks, for transmission of data via routing; and
- a gateway system for linking the communication system to at least one unsecured external network;
- wherein the at least one network which is superimposed is configured so that network layer communication via the superimposed network is only authorized between authenticated system components;
- wherein each of the plurality of local networks comprises at least one switch, which configured to authenticate each connected terminal device and assign them each connected terminal device in accordance with a respective terminal device identity to a physical or logical local network;
- wherein each of the plurality of local networks is configured so that security layer communication within the local networks is implicitly authorized due to an assignment of the respective terminal devices to the same local network;
- wherein the terminal devices are each configured so that communication on at least one of open systems interconnection (OSI) layer 3-7 between terminal devices of different local networks and with terminal devices in the unsecured external network is authorized via zero trust proxies which are each assigned to a local network;
- wherein the zero trust proxies are each configured so that the terminal devices are authenticated for each session via the zero trust proxy assigned to their respective local network; and
- wherein a zero trust proxy entity in the gateway system being provided in each case at least one of for each physical local network a zero trust proxy in said network and for each logical local network.

* * * * *